(12) United States Patent
Brown

(10) Patent No.: US 6,206,410 B1
(45) Date of Patent: Mar. 27, 2001

(54) ASSEMBLY FOR HOUSING AN INFLATABLE AIRBAG

(75) Inventor: Betty L. Brown, Canton, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/356,781

(22) Filed: Jul. 16, 1999

(51) Int. Cl.[7] .................................................. B60R 21/20
(52) U.S. Cl. .................................... 280/728.3; 297/216.13
(58) Field of Search ............................. 280/728.3, 730.2, 280/728.1, 729; 297/216.13, 216.1

(56) References Cited

U.S. PATENT DOCUMENTS

| | | |
|---|---|---|
| 5,498,030 | 3/1996 | Hill et al. . |
| 5,553,887 | 9/1996 | Karlow et al. . |
| 5,630,615 | 5/1997 | Miesik . |
| 5,639,111 | 6/1997 | Spencer et al. . |
| 5,651,582 | 7/1997 | Nakano . |
| 5,678,853 | 10/1997 | Maly . |
| 5,744,776 | 4/1998 | Bauer . |
| 5,749,597 * | 5/1998 | Saderholm ........................ 280/728.2 |
| 5,762,363 | 6/1998 | Brown et al. . |
| 5,816,610 | 10/1998 | Higashiura et al. . |
| 5,860,673 * | 1/1999 | Hasegawa et al. ............... 280/730.2 |
| 5,863,063 | 1/1999 | Harrell . |
| 5,893,579 * | 4/1999 | Kimura et al. .................... 280/730.2 |
| 5,927,749 | 7/1999 | Homier et al. . |
| 5,967,603 | 10/1999 | Genders et al. . |
| 6,007,091 * | 12/1999 | Westrich ........................... 280/730.2 |
| 6,095,602 * | 8/2000 | Umezawa et al. ................ 297/216.1 |
| 6,245,151 * | 4/2000 | Wu ..................................... 280/728.3 |

FOREIGN PATENT DOCUMENTS

| | | |
|---|---|---|
| 2185296 | 3/1997 | (CA) . |
| 0782944 | 7/1997 | (EP) . |
| 2293355 | 3/1996 | (GB) . |
| 971212 | 3/1997 | (JP) . |
| 8258660 | 10/1997 | (JP) . |

* cited by examiner

*Primary Examiner*—Michael Mar
*Assistant Examiner*—Lynda Jasmin
(74) *Attorney, Agent, or Firm*—Foley & Lardner

(57) ABSTRACT

An assembly of the invention includes a two-section trim cover for covering a component of a vehicle. The outer surfaces of the trim sections are secured to each other thereby forming a plain seam, with margin portions of the trim cover folded inward of the outer surfaces. The assembly further includes a two-section cavity liner for directing the force of the inflatable airbag in a direction toward the plain seam. To prevent the margin portions of the trim cover from blocking the plain seam, the margin portions of the trim cover are secured to the liner sections. The margin portions of the trim cover are, however, secured to the liner sections without substantial penetration through the outer surfaces of the trim cover. For this reason, the assembly offers an aesthetically pleasing housing for an inflatable airbag as the stitching is substantially hidden from a vantage facing the outer surfaces of the trim cover.

15 Claims, 6 Drawing Sheets

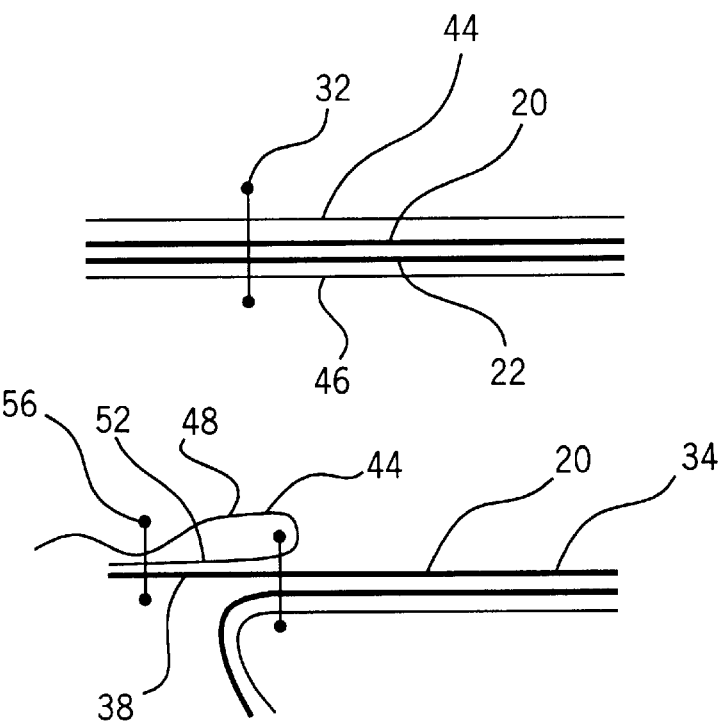
FIG. 3
FIG. 4
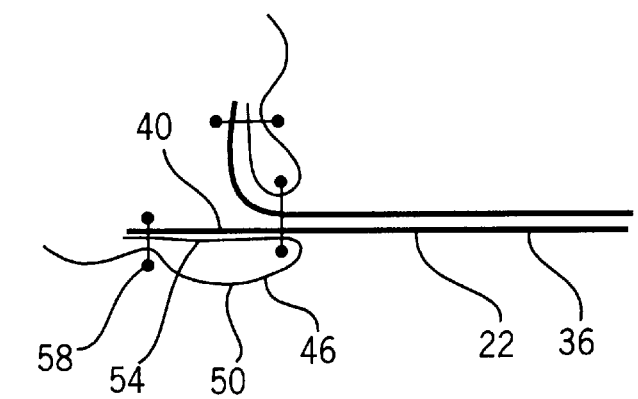
FIG. 5
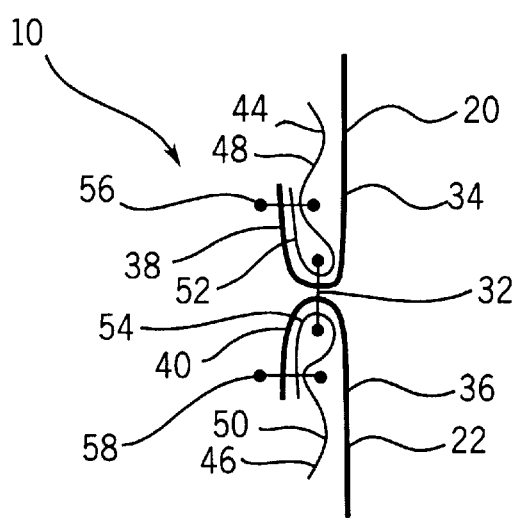
FIG. 6

ASSEMBLY FOR HOUSING AN INFLATABLE AIRBAG

FIELD OF THE INVENTION

The invention relates generally to an assembly for housing an inflatable airbag. More particularly, the invention relates to an assembly that includes a cavity liner for directing the force of an inflatable airbag in a direction towards a particular seam in the trim cover, thereby directing deployment of the inflatable airbag through the particular seam.

BACKGROUND FOR THE INVENTION

In recent years, automobile manufacturers have directed an increasing amount of attention towards providing improved side impact protection for vehicle passengers. One of the viable methods includes providing an inflatable airbag mounted to the seat back frame of a passenger seat. Seat mounted side impact inflatable airbags (SIAB) fall into two general categories. The first type of seat mounted SIABs deploys from a visible, discrete door on the outboard side of the seat back or seat cushion bolster. The other type of seat mounted SIABs is stowed beneath the seat trim and is designed to deploy through the trim cover.

In some respects, the first type has an advantage in that the technology for the deployment of an airbag through a discrete door has been already developed for frontal airbags in steering wheels and instrument panels. The first type has the disadvantage, however, in that the location of the SIAB is generally limited to the side of the seat so that the visible door is not a part of the seating surface engaged by a seat occupant. If it is desired for the airbag to deploy through the front corner of the seat back, such as the location of a bolster seam, the first type of seat mounted SIABs cannot be used. Rather, the second type of seat mounted SIABs must be used, typically under the trim cover and the foamed padding such that the airbag does not adversely affect the seat comfort.

One of the recent developments for the second type of seat mounted side impact airbags includes the use of a cavity liner for directing the force of the airbag in a direction towards a particular seam. One of the disadvantages of a cavity liner, however, is that the cavity liner is typically topstitched into the trim cover for the seat back of the passenger seat. The front corner of the seat back is one of the most visible aspects of the passenger scat and a topstitch at the bolster seam is considered by prospective buyers of expensive automobiles as an aesthetically unpleasant feature. Thus, there is a need to provide a seat mounted side impact airbag without any visible topstitches in the bolster seam of the passenger seat.

BRIEF SUMMARY OF THE INVENTION

Accordingly, the invention provides an assembly for housing an inflatable airbag module that overcomes the problems and disadvantages of the conventional techniques in the art. The present invention also provides for an assembly that offers an aesthetically pleasing housing for an inflatable airbag.

Briefly, the assembly of the invention includes a two-section trim cover for covering a component of a vehicle. The outer surfaces of the trim sections are secured to each other thereby forming a plain seam, with margin portions of the trim cover folded inward of the outer surfaces. The assembly further includes a two-section cavity liner for directing the force of the inflatable airbag in a direction toward the plain seam. To prevent the margin portions of the trim cover from blocking the plain seam, the margin portions of the trim cover are secured to the liner sections. The margin portions of the trim cover are, however, secured to the liner sections without substantial penetration through the outer surfaces of the trim cover. For this reason, the assembly offers an aesthetically pleasing housing for an inflatable airbag as the stitching is substantially hidden from a vantage facing the outer surfaces of the trim cover.

BRIEF DESCRIPTION OF THE DRAWINGS

Further features and advantages of the invention will become apparent from the following discussion and accompanying drawings, in which:

FIGS. 3–6 are side views of the steps for producing the assembly according to the first preferred method of the invention;

DETAILED DESCRIPTION OF THE PREFERRED EMBODIMENTS

The following description of the first and second preferred embodiments and the first and second preferred methods is merely exemplary in nature, and is in no way intended to limit the invention, or its applications, or uses.

Figure 1:
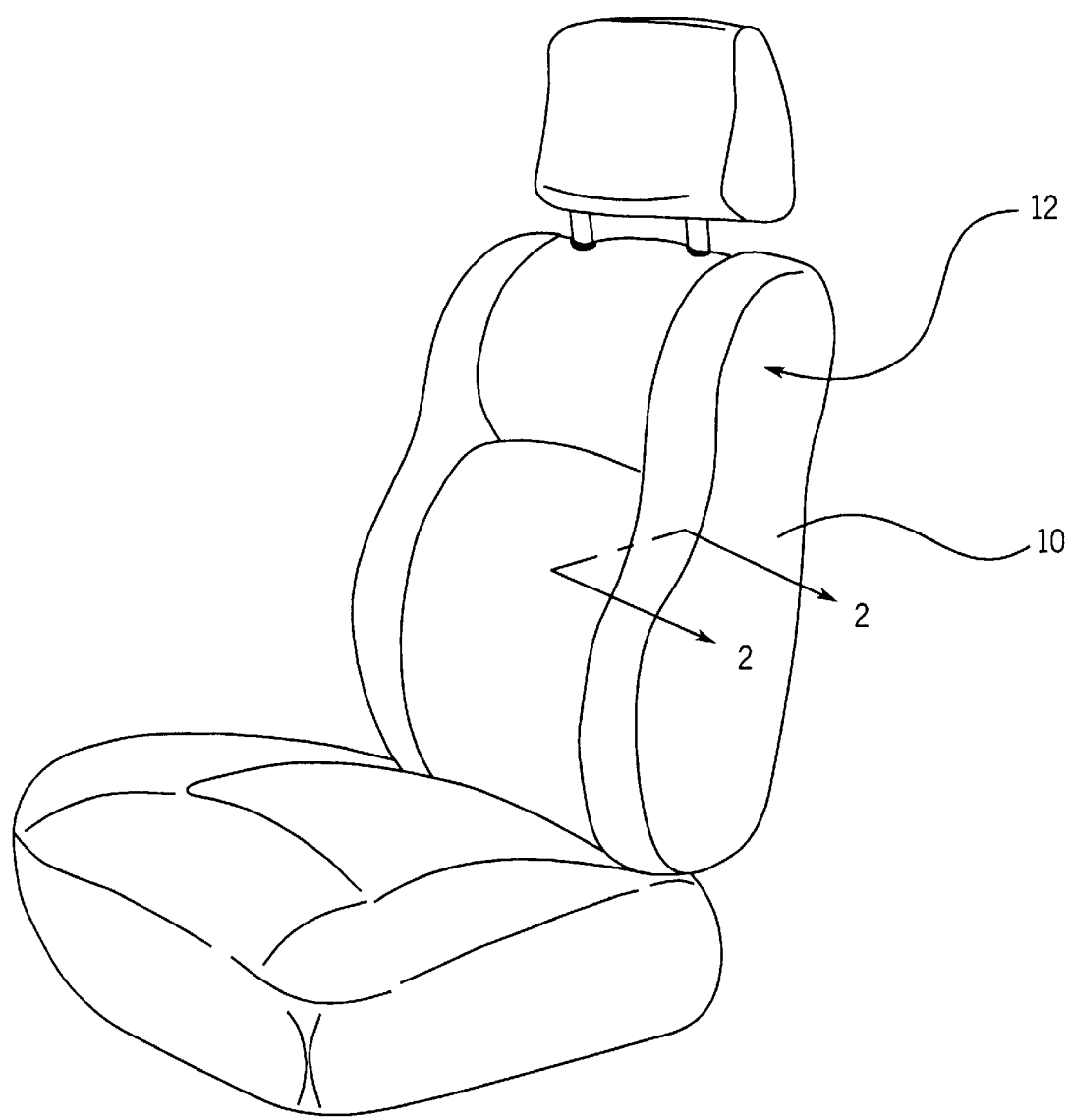
FIG. 1 is a perspective view of a passenger seat with an assembly according to a first preferred embodiment of the invention.

As shown in FIG. 1, the assembly 10 functions to cover an internal seat back frame of the passenger seat 12 and to house an inflatable airbag module hidden in the passenger seat 12 and attached to the seat back frame. The assembly 10, however, may be used to cover other components of a vehicle, for example, the dashboard, the headliner, the roof pillar, the console, or any other appropriate component.

Figure 2:
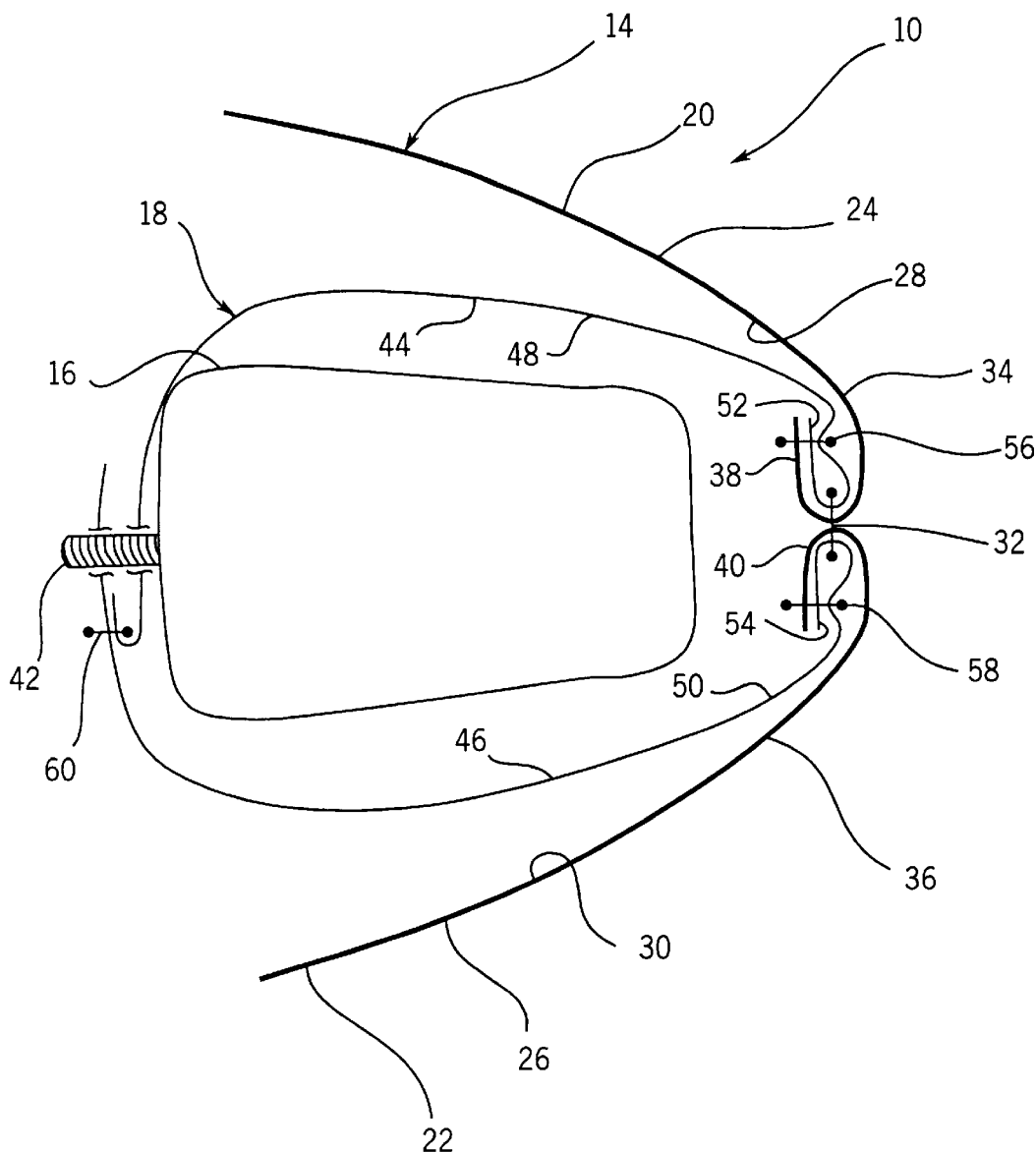
FIG. 2 is a cross-sectional view of the assembly according to the first preferred embodiment of the invention, taken along the line 2—2 in FIG. 1.

As shown in FIG. 2, the assembly 10 of the first preferred embodiment of the invention includes a trim cover 14, an inflatable airbag module 16, and a cavity liner 18. The trim cover 14 includes a first trim section 20 and a second trim section 22. Both trim sections 20 and 22 have outer surfaces 24 and 26 that are made from a durable material such as leather, cloth, and vinyl, and inner surfaces 28 and 30 that are made from a softer material such as foamed padding. The first trim section 20 is secured to the second trim section 22 with a plain seam 32. The plain seam 32 is a conventional stitch or, alternatively, may be other fasteners, such as adhesive, snaps, staples, VELCRO®, and DUAL-LOCK®. When using the plain seam 32, the trim sections 20 and 22 fold inward and the outer surface 24 of the first trim section 20 contacts the outer surface 26 of the second trim section 22. The plain seam 32 divides the trim sections 20 and 22 into body portions 34 and 36 and margin portions 38 and 40. While the outer surfaces 24 and 26 of the body portions 34 and 36 are visible to the passengers of the vehicle, the inner surfaces 28 and 30 of the body portions 34 and 36 and the entirety of the margin portions 38 and 40 are hidden.

The inflatable airbag module 16 functions to reduce the severity of a vehicular impact by quickly inflating an airbag (not shown) between a passenger of the vehicle and the surfaces of the vehicle. The inflatable airbag module 16 is a conventional side impact airbag module. The inflatable airbag module 16 connects to the seat back frame (not shown) by a fastener 42. Preferably, the fastener 42 includes a stud and a nut, but as a person of ordinary skill in the art would appreciate, other suitable fasteners can be used. In other applications, the inflatable airbag module 16 may be secured to a dashboard structural member, a roof portion, a roof pillar, or any other suitable structural element of the vehicle. Inflatable airbag modules are known and used in the art of inflatable airbag systems, and the implementation of the inflatable airbag module 16 into the assembly 10 would be readily understood by a person of ordinary skill in the art.

As the airbag inflates, it rapidly increases in volume and pushes on the trim cover 14. To direct deployment of the airbag through the trim cover 14, the cavity liner 18 of the invention directs the force of the airbag in a direction toward the plain seam 32. The cavity liner 18 includes a first liner section 44 and a second liner section 46. The first liner section 44 is secured to the first trim section 20 at the plain seam 32, and the second liner section 46 is secured to the second trim section 22 at the plain seam 32. In this way, the plain seam 32 further divides the liner sections 44 and 46 into body portions 48 and 50 and margin portions 52 and 54. To direct the force of the inflatable airbag towards the plain seam, the margin portions 38, 40, 52, and 54 are secured to the body portions 48 and 50 of the cavity liner 18. The margin portion 52 of the first liner section 44 and the margin portion 38 of the first trim section 20 are secured to the body portion 48 of the first liner section 44 by a first margin seam 56. Likewise, the margin portion 54 of the second liner section 46 and the margin portion 40 of the second trim section 22 are secured to the body portion 50 of the second liner section 46 by a second margin seam 58. The margin seams 56 and 58, like the plain seam 32, are a conventional stitch or, alternatively, may be other fasteners, such as adhesive, snaps, staples, VELCRO®, and DUAL-LOCK®. Both margin seams 56 and 58, however, do not penetrate through the outer surfaces 24 and 26 of the trim cover 14. In other words, the margin seams 56 and 58 are substantially hidden from a vantage facing the outer surfaces 24 and 26 of the trim cover 14. For this reason, the assembly 10 offers an aesthetically pleasing housing for an inflatable airbag.

The first liner section 44 and the second liner section 46 are made from a substantially non-elastic material such as 420, 630, or 840 denier nylon or polyester airbag fabric, or from other suitable materials. A rear seam 60 secures the first liner section 44 and the second liner section 46 to each other. Although more challenging from a manufacturing standpoint, the first liner section 44 may be integrally formed with the second liner section 46 in a one-piece cavity liner (not shown).

The assembly 10 of the first preferred embodiment of the invention may be produced by the following four general steps: (1) providing a first trim section 20 and a second trim section 22, and providing a first liner section 44 and a second liner section 46; (2) stitching a plain seam 32 through the first liner section 44, the first trim section 20, the second trim section 22, and the second liner section 46, as shown in FIG. 3; (3) folding the body portion 48 of the first liner section 44 over the margin portion 52 of the first liner section 44, and stitching a first margin seam 56 through the body portion 48 of the first liner section 44 and the margin portion 38 of the first trim section 20, without substantial penetration through the body portion 34 of the first trim section 20 by the stitching, as shown in FIG. 4; and (4) folding the body portion 50 of the second liner section 46 over the margin portion 54 of the second liner section 46, and stitching a second margin seam 58 through the body portion 50 of the second liner section 46 and the margin portion 40 of the second trim section 22, without substantial penetration through the body portion 36 of the second trim section 22 by the stitching as shown in FIG. 5. In its final form, as shown in FIG. 6, the assembly 10 may now house an inflatable airbag (not shown).

In the first preferred method of the invention, steps 1 through 4 are followed in numerical order. In alternate methods, steps 1 through 4 may be followed in a different order.

Figure 7:
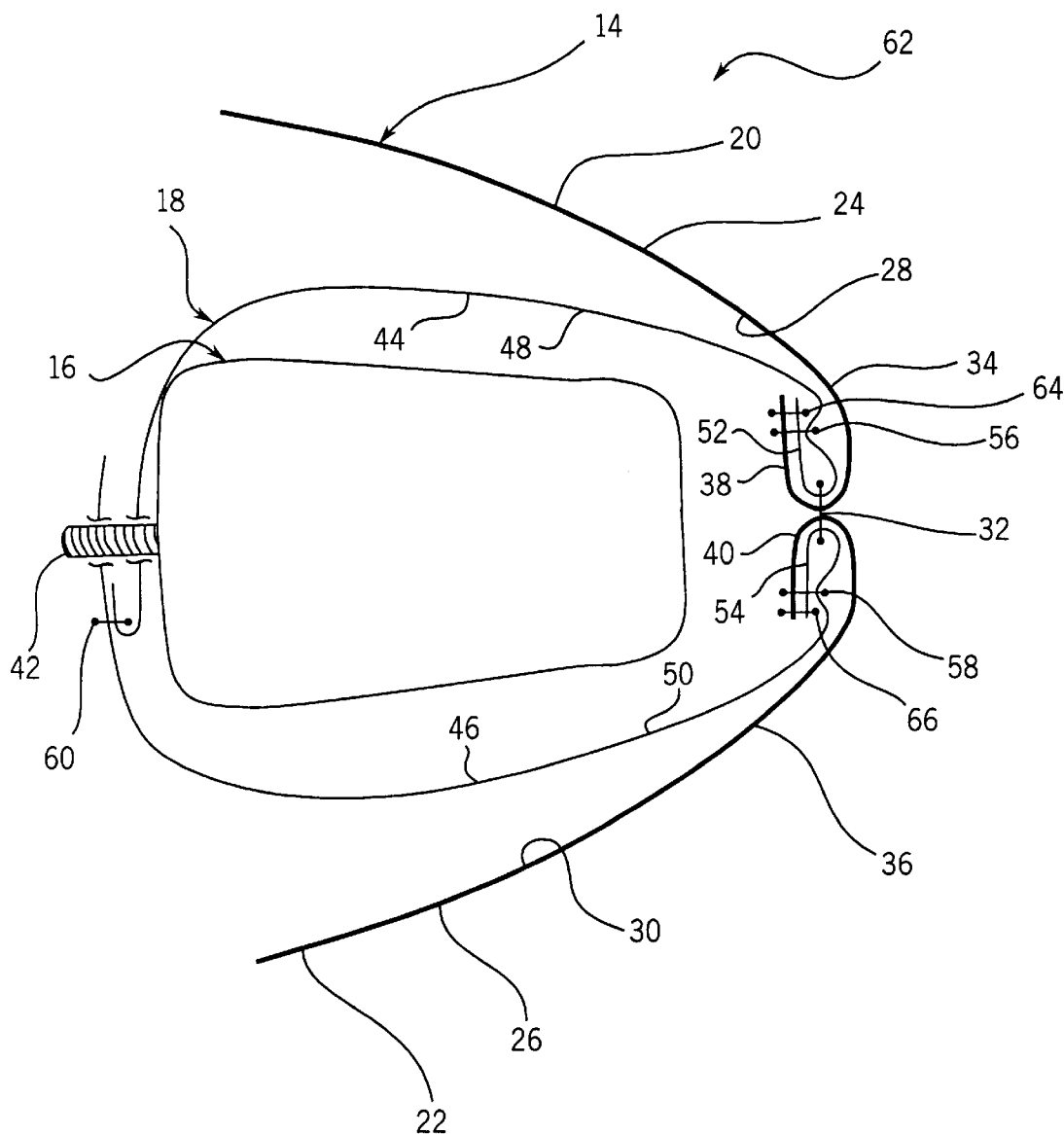
FIG. 7 is a cross-sectional view of the assembly according to a second preferred embodiment of the invention.

As shown in FIG. 7, an assembly 62 of a second preferred embodiment of the invention includes a first minor tack 64 and a second minor tack 66. The minor tacks 64 and 66 function to secure the margin portions 38 and 40 of the trim cover 14 to the margin portions 52 and 54 of the cavity liner 18. The minor tacks 64 and 66, like the plain seam 32 and the margin seams 56 and 58, are a conventional stitch or, alternatively, may be other fasteners, such as adhesive, snaps, staples, VELCRO®, and DUAL-LOCK®. In all other aspects, the assembly 62 of the second preferred embodiment functions like the assembly 10 of the first preferred embodiment. For this reason, the elements of FIG. 2 are shown with the same reference numerals of FIG. 7.

Figure 8:
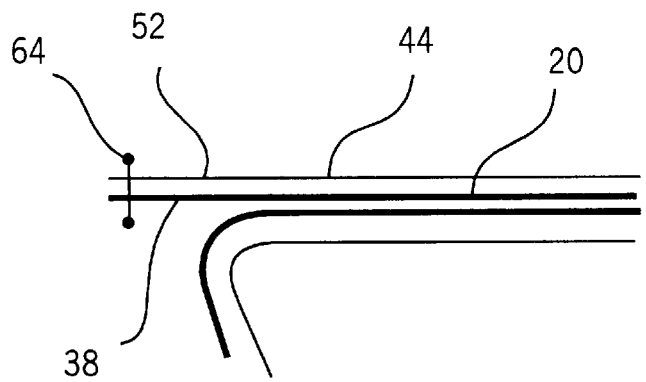
FIGS. 8—13 are side views of the steps for producing the assembly according to the second preferred method of the invention.
Figure 9:
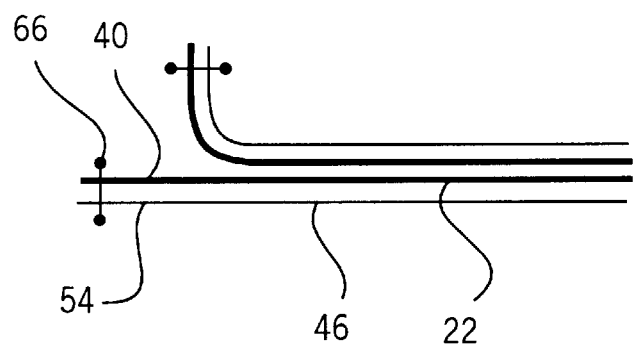
Figure 10:
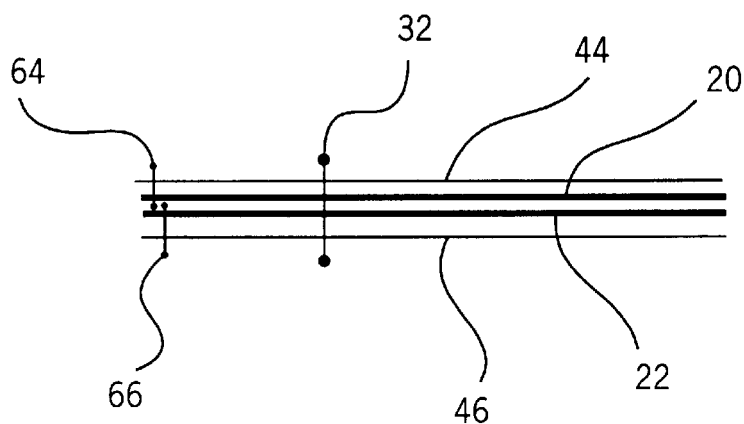
Figure 11:
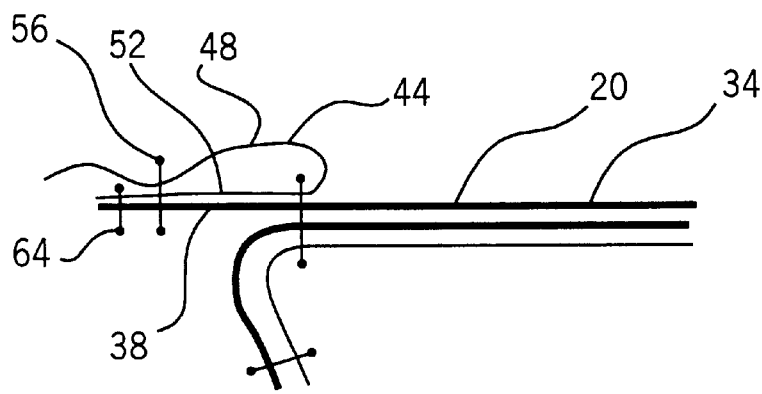
Figure 12:
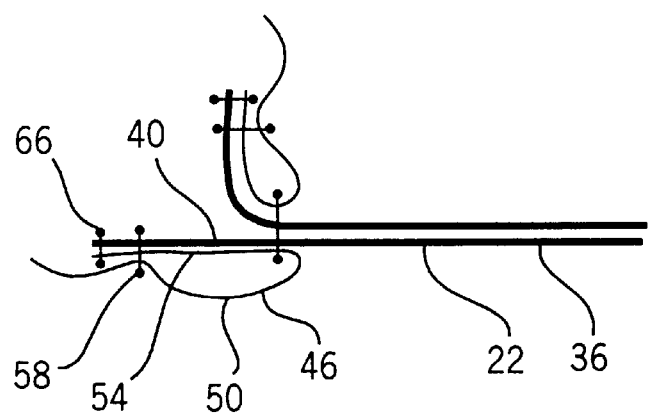
Figure 13:
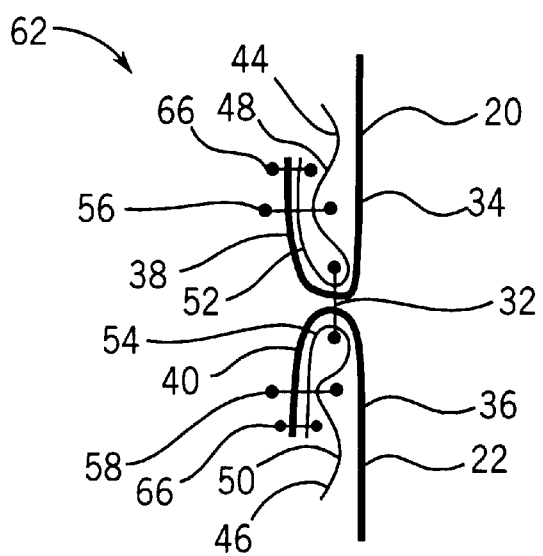

The second preferred method, which produces the assembly 62 of the second preferred embodiment, includes an additional step that occurs between step 1 and step 2 discussed above with respect to the first preferred method of the invention. The additional step includes stitching the first minor tack 64 through the margin portion 52 of the first liner section 44 and the margin portion 38 of the first trim section 20, as shown in FIG. 8. The additional step further includes stitching the second minor tack 66 through the margin portion 54 of the second liner section 46 and the margin portion 40 of the second trim section 22, as shown in FIG. 9. The additional step functions to align the margin portions 52 and 54 with the margin portions 38 and 40. In all other aspects, steps 2, 3, and 4, as shown in FIGS. 10, 11, and 12, are like the steps 2, 3, and 4 shown in FIGS. 3, 4, and 5. Further, in all other aspects, the assembly 62 of the second preferred embodiment, as shown in FIG. 13, is like the assembly 10 of the first preferred embodiment shown in FIG. 6. For these reasons, the elements of FIGS. 8–13 are shown with the same reference numerals of FIGS. 3–6.

The foregoing discussion discloses and describes preferred embodiments and methods of the invention. One skilled in the art will readily recognize from such discussion, and from the accompanying drawings and claims, that changes and modifications can be made to the invention without departing from the true spirit and fair scope of the invention as defined in the following claims.

I claim:

1. An assembly for housing an inflatable airbag, comprising:

a trim cover for covering a component of a vehicle, said trim cover having a first trim section and a second trim section, said first trim section having an outer surface and an inner surface, said second trim section having an outer surface and an inner surface, said outer surface of said first trim section being secured to said outer surface of said second trim section thereby forming a plain seam, said plain seam defining a body portion and a margin portion of said first trim section, and said plain seam defining a body portion and a margin portion of said second trim section;

an inflatable airbag; and a cavity liner for directing the force of said inflatable airbag in a direction toward said plain seam, said cavity liner having a first liner section and a second liner section, said first liner section being secured to said first trim section at said plain seam, said plain seam defining a body portion and a margin portion of said first liner section, said margin portion of said first trim section being secured to said margin portion of said first liner section at a first minor tack, said second liner section being secured to said second trim section at said plain seam, and said plain seam defining a body portion and a margin portion of said second liner section, said margin portion of said second trim section being secured to said margin portion of said second liner section at a second minor tack;

wherein said margin portion of said first trim section is secured to said body portion of said first liner section between said first minor tack and said plain seam thereby forming a first margin seam without substantial penetration through said outer surface of said body portion of said first trim section, and wherein said margin portion of said second trim section is secured to said body portion of said second liner section between said second minor tack and said plain seam thereby forming a second margin seam without substantial penetration through said outer surface of said body portion of said second trim section.

2. An assembly for housing an inflatable airbag, comprising:

a trim cover for covering a component of a vehicle, said trim cover having a first trim section and a second trim section, said first trim section having an outer surface and an inner surface, said second trim section having an outer surface and an inner surface, said outer surface of said first trim section being secured to said outer surface of said second trim section thereby forming a plain seam, said plain seam defining a body portion and a margin portion of said first trim section, and said plain seam defining a body portion and a margin portion of said second trim section; and a cavity liner for directing the force of the inflatable airbag in a direction toward said plain seam, said cavity liner having a first liner section and a second liner section, said first liner section being secured to said first trim section at said plain seam, said plain seam defining a body portion and a margin portion of said first liner section, said second liner section being secured to said second trim section at said plain seam, and said plain seam defining a body portion and a margin portion of said second liner section;

wherein said margin portion of said first trim section is secured to said body portion of said first liner section without substantial penetration through said outer surface of said body portion of said first trim section, and wherein said margin portion of said second trim section is secured to said body portion of said second liner section without substantial penetration through said outer surface of said body portion of said second trim section.

3. The assembly of claim 2, wherein said margin portion of said first trim section is secured to said body portion of said first liner section thereby forming a first margin seam, wherein said margin portion of said second trim section is secured to said body portion of said second liner section thereby forming a second margin seam.

4. The assembly of claim 3, wherein said margin portion of said first trim section is further secured to said margin portion of said first liner section, and wherein said margin portion of said second trim section is further secured to said margin portion of said second liner section.

5. The assembly of claim 4, wherein said margin portion of said first trim section is secured to said margin portion of said first liner section at said first margin seam, and wherein said margin portion of said second trim section is secured to said margin portion of said second liner section at said second margin seam.

6. The assembly of claim 4, wherein said margin portion of said first trim section is secured to said margin portion of said first liner section at a first minor tack, and wherein said margin portion of said second trim section is secured to said margin portion of said second liner section at a second minor tack.

7. The assembly of claim 6, wherein said first margin seam is located on said first liner section between said first minor tack and said plain seam, and wherein said second margin seam is located on said second liner section between said second minor tack and said plain seam.

8. The assembly of claim 2, wherein said first liner section is secured to said inner surface of said first trim section at said plain seam, and wherein said second liner section is secured to said inner surface of said second trim section at said plain seam.

9. A method for producing an assembly for housing an inflatable airbag, comprising the steps of:

(a) providing a trim cover having a first trim section and a second trim section, and providing a cavity liner having a first liner section and a second liner section;

(b) stitching a plain seam through the first liner section, the first trim section, the second trim section, and the second liner section, the plain seam defining body portions and margin portions of the first liner section, the first trim section, the second trim section, and the second liner section;

(c) folding the body portion of the first liner section over the margin portion of the first liner section, and stitching a first margin seam through the body portion of the first liner section and the margin portion of the first trim section, without substantial penetration through the body portion of the first trim section; and (d) folding the body portion of the second liner section over the margin portion of the second liner section, and stitching a second margin seam through the body portion of the second liner section and the margin portion of the second trim section, without substantial penetration through the body portion of the second trim section.

10. The method of claim 9, herein step (b) occurs before steps (c) and (d).

11. The method of claim 9, wherein step (c) includes stitching a first margin seam through the body portion of the first liner section, the margin portion of the first liner section, and the margin portion of the first trim section, without substantial penetration through the body portion of the first trim section.

12. The method of claim 11, wherein step (d) includes stitching a second margin seam through the body portion of the second liner section, the margin portion of the second liner section, and the margin portion of the second trim section, without substantial penetration through the body portion of the second trim section.

13. The method of claim 9, further comprising steps (e) stitching a first minor tack through the margin portion of the first liner section and the margin portion of the first trim section, and stitching a second a minor tack through the margin portion of the second liner section and the margin portion of the second trim section.

14. The method of claim 13, wherein step (e) occurs before step (b).

15. The method of claim 14, wherein step (b) occurs before steps (c) and (d).

* * * * *